United States Patent [19]

Sons, Jr. et al.

[11] 3,882,919
[45] May 13, 1975

[54] SAFETY RIM

[75] Inventors: Charles C. Sons, Jr., Peoria; Danny L. Johnston, Morton, both of Ill.

[73] Assignee: Caterpillar Tractor Company, Peoria, Ill.

[22] Filed: Dec. 13, 1973

[21] Appl. No.: 418,401

[52] U.S. Cl. ............... 152/410; 152/40 S; 152/427; 301/63 D
[51] Int. Cl. ............................................. B60c 5/00
[58] Field of Search........... 301/63 D, 10 R, 23, 22, 301/9 TV; 152/396, 405, 406, 407, 408, 409, 410, 411, 415, 427

[56] References Cited
UNITED STATES PATENTS

| 3,118,484 | 1/1964 | Le Jeune | 152/410 |
|---|---|---|---|
| 3,121,455 | 2/1964 | Scott | 152/427 |
| 3,224,484 | 12/1965 | Smith | 152/405 |
| 3,529,869 | 9/1970 | Casey | 301/63 D |
| 3,783,927 | 1/1974 | Verdier | 152/405 |

Primary Examiner—Lloyd L. King
Assistant Examiner—Reinhard J. Eisenzopf
Attorney, Agent, or Firm—Phillips, Moore, Weissenberger, Lempio & Strabala

[57] ABSTRACT

A safety rim assembly for wheels for pneumatic tires is provided which prevents the sudden dislodgement of rim components during tire inflation and disassembly, and eliminates the safety hazard represented thereby. The assembly includes a retainer for retaining rim components in position during inflation, and a passage for venting the interior of the tire during inflation when the rim components are improperly assembled, thereby preventing inflation of the tire.

9 Claims, 7 Drawing Figures

Fig_1_

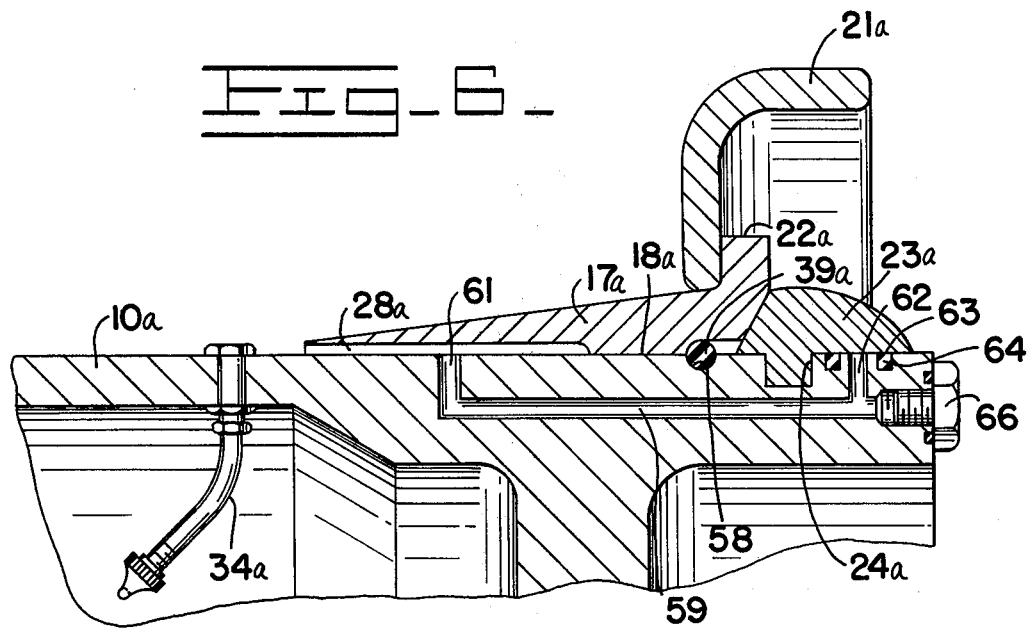
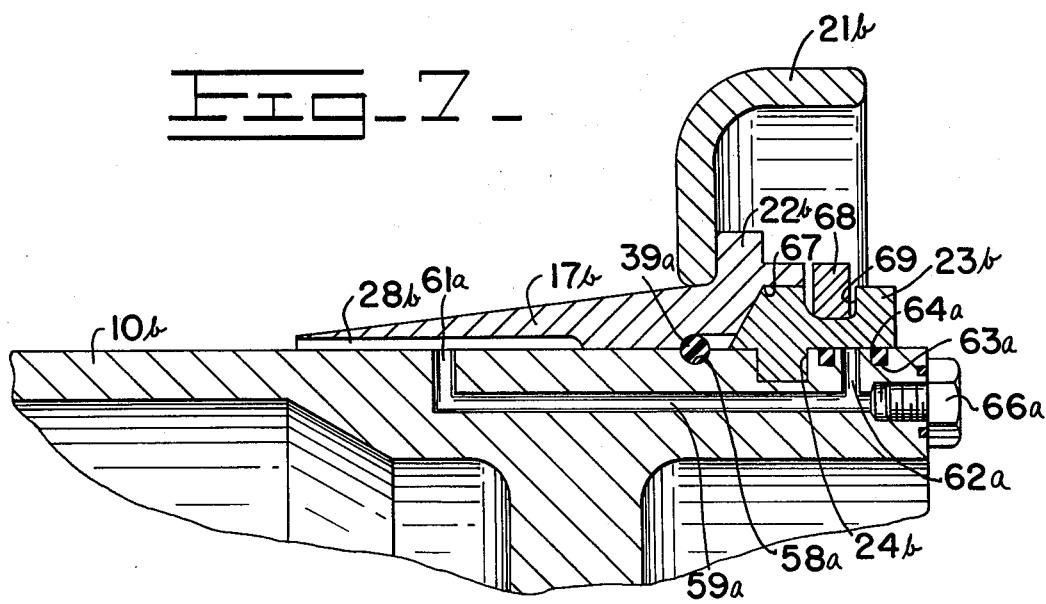

SAFETY RIM

BACKGROUND OF THE INVENTION

This invention relates to wheels for pneumatic tires. In particular, the invention relates to a safety rim assembly for such wheels which prevents inflation of the tire when it is incorrectly mounted.

Large tubeless pneumatic tires are commonly mounted on a rim base having an integral bead seat and abutment flange on one axial end for sealingly retaining one side of a tire thereon. The other side of the tire is conventionally sealingly retained by a removable bead seat and removable locking means for retaining the bead seat against the mounted tire, such as a lock ring. The lock ring is seated in an annular groove formed in the periphery of the rim, and is retained therein by a wedging action of the bead seat.

One of the problems encountered with such mounting arrangements is that improper seating of the lock ring in the groove usually results in a sudden dislodgement of the lock ring from the groove when the tire is inflated. The lock ring and bead seat are thus liable to be catapulted off the rim with explosive force, becoming hazardous and potentially lethal projectiles. A similar result could occur should an attempt be made to remove the lock ring with the tire inflated.

SUMMARY AND OBJECTS OF THE INVENTION

Accordingly, the invention provides a safety rim assembly for pneumatic tire wheels including retaining means in the form of a retainer for retaining a lock ring in position against a bead seat band which prevents inflation of the tire when the lock ring is improperly seated. The rim assembly includes a plurality of passageways communicating with the interior of the tire which are sealingly closed by the retaining means when the lock ring is properly seated and the retaining means are properly installed. The lock ring, retaining means and rim passageways are associated so that incorrect seating of the lock ring or improper installation of the retaining means prevents closure of the rim passageways by the retaining means, thereby venting the interior of the tire and preventing inflation.

It is therefore an object of the invention to provide a safety rim assembly for pneumatic tires which prevents inflation of the tire when the components are improperly assembled and insures deflation of the tire prior to disassembly for reasons of safety.

It is another object of the invention to provide a safety rim assembly for pneumatic tires which substantially prevents the components from becoming hazardous projectiles during tire inflation in the event of improper assembly of these components.

It is an additional object of this invention to provide a safety rim assembly including retaining means for retaining rim assembly components in position against a mounted tire which prevent inflation of the tire when safety rim components are improperly assembled.

It is a further object of this invention to provide a safety rim assembly for pneumatic tires including means for preventing relative rotation of the rim assembly components.

Other objects and advantages of the invention will become apparent from the following description and appended claims.

BRIEF DESCRIPTION OF THE DRAWINGS

FIG. 6 is a fragmentary elevation view of an alternate embodiment of the safety rim assembly of FIG. 1; and FIG. 7 is a modification of the alternate embodiment of the safety rim assembly of FIG. 6.

DETAILED DESCRIPTION

Figure 1:
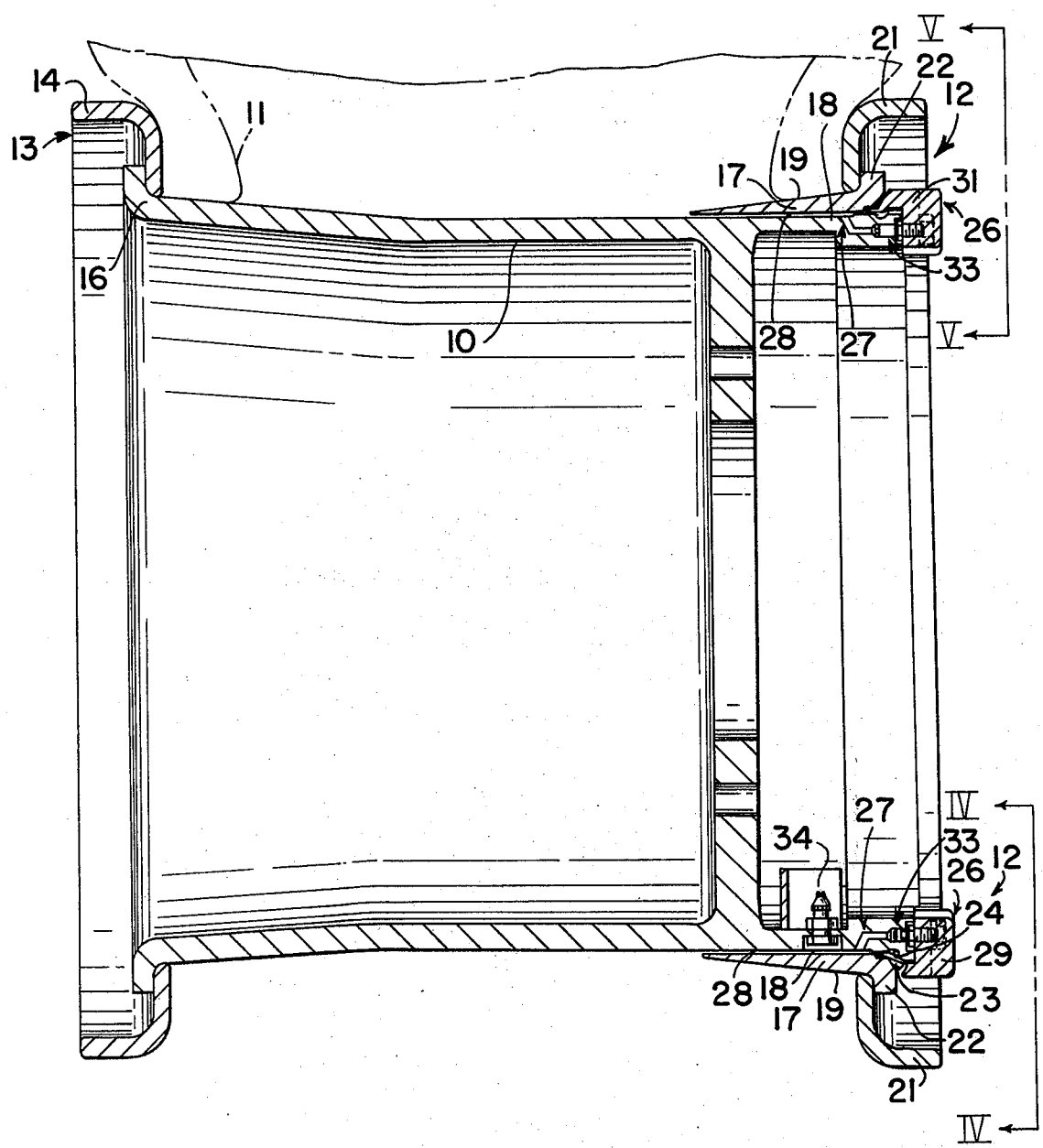
FIG. 1 is a cross-sectional elevation view of the safety rim assembly of this invention in conjunction with a conventional rim having a tire mounted thereupon.

With particular reference to FIGS. 1–5, a rim base 10 is illustrated having a tire 11 mounted between a safety rim assembly generally indicated at 12, and opposing rim means 13 such as a first annular flange 14 disposed against a rim base lip 16 of the rim base 10, for retaining the tire 11 on the rim base 10.

The rim assembly 12 includes support means comprising a bead seat band 17, annularly disposed around an outer periphery 18 of the rim base 10, having a bead seat 19 adapted for sealing engagement with the bead of tire 11, and a second annular flange 21 disposed against a lip 22 of band 17, for supporting the tire 11 on the base 10. The assembly 12 further includes locking means for locking the band 17 and the flange 21 in position on the base 10 against the tire 11 comprising a lock ring 23 seated in an annular groove 24 formed in the periphery 18 of the base 10, and a plurality of members generally indicated at 26 to be hereinafter described.

The periphery 18 of the rim base 10 is provided with a plurality of passage means generally indicated at 27 for venting the interior of the tire 11. The passage means 27, when open, communicate between the interior of the tire 11 and the atmosphere via an annular gap 28 defined by the adjacent surfaces of the band 17 and the base 10. The members 26 include sealing means 33 for sealing the passage means 27 to prevent the egress of air from the interior of the tire 11 during inflation of the tire when the components of the assembly 12 are properly assembled. Each of the members 26 further includes retaining means such as a retainer block 29 for retaining the lock ring 23 in the groove 24 during inflation of the tire 11. Preferably, at least one of the members 26 is provided with means for preventing relative rotation between the lock ring 23 and the other assembly components such as a modified block 31 included in a member 26 in lieu of a retainer block 29. The blocks 29 and 31 are removably securable to the base 10 as by bolts 32.

A tire valve assembly 34 is disposed on the inner wall of the outer periphery 18 in communication with the interior of the tire 11 via the gap 28 for admitting air under pressure from an air supply source (not shown) to the interior of the tire 11 for inflation thereof.

Figure 2:
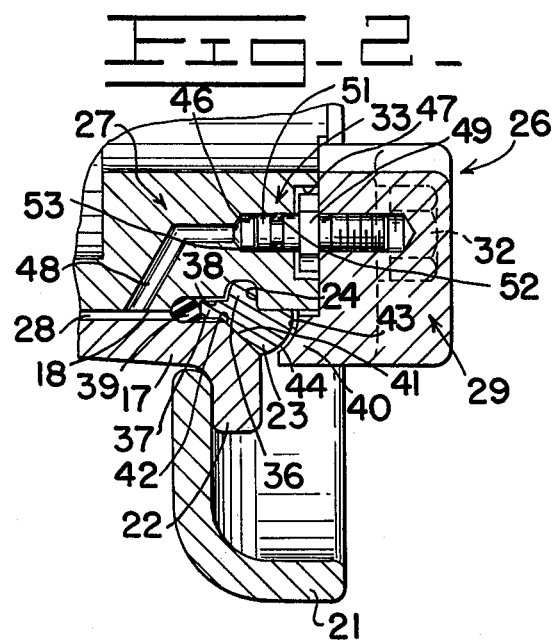
FIG. 2 is a fragmentary cross-sectional elevation view of the safety rim assembly of this invention, including retaining means therefor.
Figure 4:
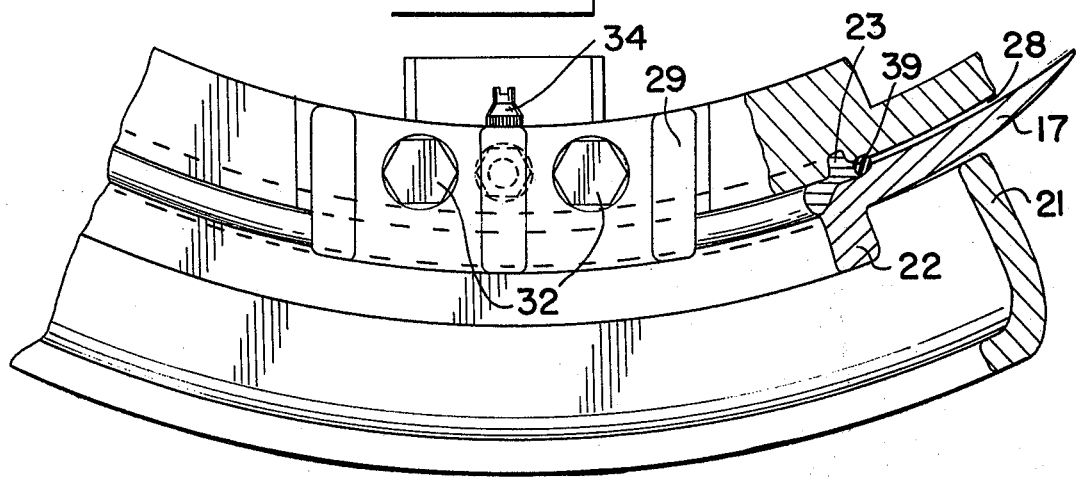
FIG. 4 is a fragmentary side elevation view of the safety rim assembly of this invention taken along the line IV—IV of FIG. 1.

With particular reference to FIGS. 2 and 4, the band 17 and flange 21 are shown locked in position on the base 10 by the lock ring 23. The lock ring 23 comprises an annular split lock ring having a radially inwardly extending tang portion 36 seatable within the groove 24, and an axially inwardly extending annular projection 37 accommodated within an annular recess 38 within the base 10 in communication with the gap 28. An annular resilient seal 39 is disposed within the recess 38 between the base 10 and the band 17 and retained in position by the projection 37 of the lock ring 23 so that the gap 28 is sealed against the passage of air therethrough when the lock ring 23 is properly seated in the groove 24. The outer periphery of the lock ring 23 includes an inwardly facing angled wedge surface 41 conforming to an outwardly facing angled wedge surface 42 of the band 17 and adapted to mate therewith when lock ring 23 is seated in the groove 24.

As illustrated in FIGS. 2 and 4, the lock ring 23 is retained in position by the members 26 including the blocks 29 threadably secured to the base 10 by the bolts 32. The block 29 includes an axially inwardly extending flange 40 having a contoured inwardly facing surface 43 disposed adjacent to an outwardly facing surface 44 of the lock ring 23 when the block 29 is secured to the base 10. The surface 43 of the block 29 and the surface 44 of the lock ring 23 are in substantially mating relationship, so that dislodgment of the lock ring 23 is prevented when the block 29 is properly installed, and so that proper installation of the block 29 is prevented if the lock ring 23 is not properly seated in the groove 24.

The passage means 27 include a bore 46, a counterbore 47 and a passageway 48 intercommunicating within the periphery 18 and communicating between the gap 28 and the atmosphere when the passage means are not sealed by proper installation of the block 29, thereby venting air from the interior of the tire 11 to the atmosphere when inflation is attempted. The sealing means 33 include a seal-support member 49 removably secured to an inwardly facing surface of the block 29 and having a stem 51 engageable within the bore 46. A seal 52 is disposed within an annular groove 53 at the distal end of the stem 51 so that engagement of the stem 51 in the bore 46 prevents the passage of air from the interior of the tire 11 to the atmosphere through passage means 27 when the block 29 is properly installed.

Figure 3:
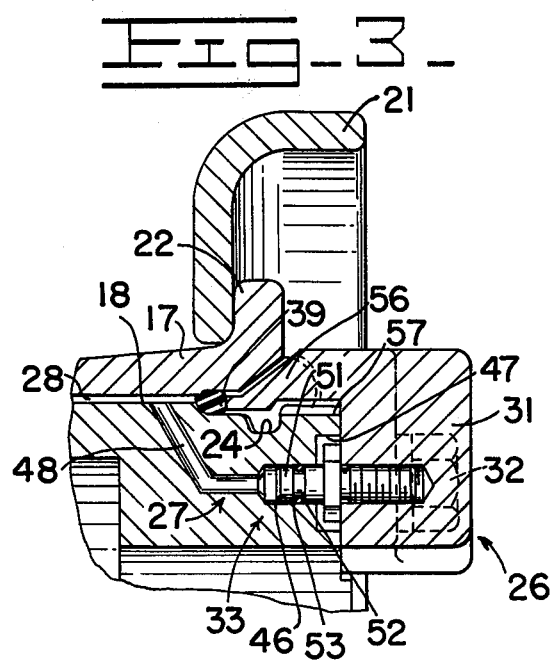
FIG. 3 is a fragmentary cross-sectional elevation view of the safety rim assembly of this invention, including retaining means therefor having means for preventing relative rotation of the assembly components.
Figure 5:
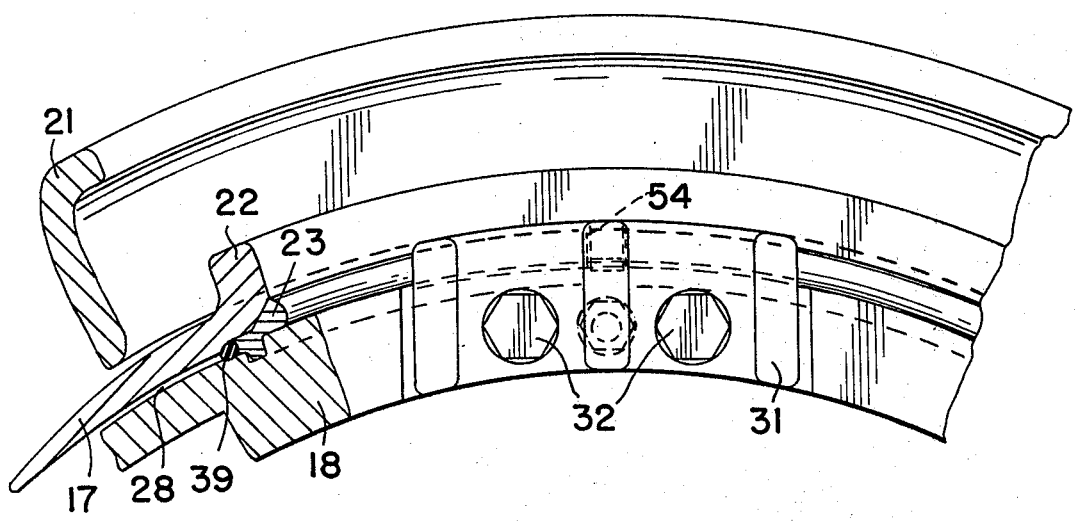
FIG. 5 is a fragmentary side elevation view of the safety rim assembly of this invention taken along the line V—V of FIG. 1.

Preferably, rim assembly 12 includes means for preventing rotation of the lock ring 23 relative to the base 10, as best shown in FIGS. 3 and 5. The lock ring 23 is interrupted to form an opening 54 (FIG. 5) in the body thereof. The block 31 of the member 26 includes an axially inwardly extending finger portion 56 protruding inwardly beyond the axially inwardly extending flange 40 of the block 29. The finger portion 56 of the block 31 is substantially similar in cross-section to the body portion of the lock ring 23, so that the distal portion of the finger portion 56 may be accommodated in the opening 54 in the lock ring 23; a notch 57 is provided in the rim base 10 to permit the passage of the finger portion 56 therethrough. When the block 31 is properly positioned, the distal portion of the finger portion 56 abuts the seal 39, preventing air leakage from the gap 28 at this junction.

The safety rim assembly 12 is employed in the following manner:

The tire 11 is mounted on the rim base 10 by first placing the first annular flange 14 against the rim base lip 16, and then sliding the tire onto the rim base with one side of the tire against the flange 14. The second annular flange 21 and the bead seat band 17 are then installed in sequence or simultaneously against the opposite side of the tire, forcing it inwardly until the surface of the side is slightly inboard of the recess 38. The annular seal 39 is placed in the recess 38, and the lock ring 23 installed so that the tang portion 36 is properly seated in the groove 24, and so that the opening 54 is aligned with the notch 57. The blocks 29 and 31 are then secured to the rim base 10 by the bolts 32, so that the sealing means 33 seals the bores 36 against the passage of air therethrough. The tire 11 is then inflated.

It may thus be seen that improper assembly of the components of the safety rim assembly automatically prevents inflation of the tire, thereby avoiding the potential safety hazard of suddenly dislodged rim components. Failure to install the lock ring 23 results in the displacement of the seal 39 from the recess 38 during inflation when the air pressure in the interior of the tire 11 becomes sufficiently high, thereby opening the gap 28 to the passage of air and preventing inflation of the tire 11. Improper installation of the lock ring 23 prevents proper positioning of the block 29 so that sealing means 33 cannot effectively seal the passage means 27, thereby permitting air to pass from the interior of the tire 11 through the passage means 27 and preventing inflation of the tire. Improper installation of the block 29 so that the lock ring 23 is not properly retained in the groove 24 similarly results in prevention of inflation of the tire 11.

An alternate embodiment of the invention shown in FIG. 6 includes an annular groove 58 axially inwardly disposed from the groove 24a, for receiving the seal 39a. The groove 58 thus is included in lieu of the recess 38 shown in FIGS. 1–5. A plurality of circumferentially equally spaced passages, one of which is shown at 59, extends axially inwardly of the outer periphery 18a of the rim base 10a, while a pair of axially spaced radial branch passages 61 and 62 intersect with each passage 59. Passages 61 communicate the passages 59 with the interior of the tire 11 through the annular gap 28a. The passages 62 communicate the passages 59 with the outer periphery 18a of the rim base 10a between the groove 24a and the outer surface of the rim assembly. A plurality of circular grooves 63 are formed in the outer periphery 18a of the rim base 10a and individually circumscribe the branch passages 62. A seal 64 is disposed within each circular groove 63 for sealing engagement with the lock ring 23a, and each passage 59 is sealed as by a threaded plug 66 threadably secured within the open ends of the passages 59.

The tire 11 is mounted in a similar manner to that described for the embodiment shown in FIGS. 1–5. Since sealing of the branch passages 62 depends on the coaction of the lock ring 23a and the seal 64, the tire cannot be inflated unless the lock ring is properly seated within the groove.

FIG. 7 illustrates a modified version of the rim assembly of FIG. 6, including a lock ring 23b comprising a pair of semi-circular members received in a bore 67 in the bead seat band 17b. During tire installations, the lock ring 23b is retained in the groove 24b by a snap ring 68 disposed in a groove 69 formed in the outer periphery of the lock ring. As described above, sealing of the branch passage 62a depends on the coaction of the lock ring 23b and the seal 64a, and the tire 11 cannot be inflated unless the lock ring is properly seated.

What is claimed is:

1. A pneumatic tire wheel comprising a cylindrical rim base, said base having a rim at one axial end thereof for supporting one side of a tire on said base and including a safety rim assembly at the other axial end thereof for supporting the other side of the tire on said base and for preventing hazardous dislodgement of the components of said assembly during tire inflation and disassembly, said safety rim assembly including support means for supporting the tire on said base, said support means including a bead seat band annularly disposed around the outer periphery of said rim base having a bead seat for sealing engagement with the tire, and an annular flange disposed against an outer peripheral lip of said bead seat band so that inflation of the tire presses said flange against said lip, locking means including a lock ring seated in an annular groove formed in the outer periphery of said rim base and disposed against said bead seat band so that said support means are locked in position during tire inflation, and retaining means for retaining said lock ring in said groove including a retainer block removably securable to said rim base adjacent said lock ring, said lock ring and said block having their adjacent surfaces in substantially mating relationship so that improper seating of said lock ring in said groove prevents proper installation of said retainer block, passage means communicating between the atmosphere and the rim base intermediate said rim and said safety rim assembly and sealing means for sealingly closing said passage means during functioning of said locking means to lock said support means, thereby permitting inflation of the tire, and wherein improper seating of said lock ring in said groove prevents said sealing means from sealingly closing said passage means.

2. The invention of claim 1, wherein said passage means include a passageway in the outer periphery of said rim base communicating between the atmosphere and the rim base intermediate said rim and said safety rim assembly by way of an annular gap between said bead seat band and said outer periphery of said rim base.

3. The invention of claim 2, wherein an annular seal is disposed between said bead seat band and said rim base and retained in position by said lock ring so that proper seating of said lock ring in said groove seals said gap outward of a junction formed by said passageway and said gap.

4. The invention of claim 2, wherein said sealing means includes a plug insertable in said passageway from the outer surface of said outer periphery of said rim base, and said lock ring.

5. The invention of claim 4, further including an annular bore in the outer surface of the bead seat band, said lock ring being fitted within said bore, and wherein said lock ring is retained in said groove by a snap ring disposed in a circumferential groove in said lock ring.

6. The invention of claim 1 wherin said retainer block includes said sealing means.

7. The invention of claim 6, wherein said sealing means includes a seal support member removably secured to an inwardly facing surface of said block, said member having a seal thereupon.

8. The invention of claim 7, wherein said rim assembly further includes means for preventing relative rotation of said lock ring with respect to the other components of said assembly.

9. The invention of claim 8, wherein said block includes a finger portion insertable within an opening in said lock ring.

* * * * *

UNITED STATES PATENT OFFICE
CERTIFICATE OF CORRECTION

PATENT NO. : 3,882,919
DATED : May 13, 1975
INVENTOR(S) : Charles C. Sons, Jr., et al It is certified that error appears in the above-identified patent and that said Letters Patent are hereby corrected as shown below:

On the Title Page, Item [73], change the spelling of the assignee's corporate name from "Caterpillar Tractor Company" to ---Caterpillar Tractor Co.---.

Signed and Sealed this twenty-eight Day of October 1975

[SEAL]

Attest:

RUTH C. MASON
Attesting Officer

C. MARSHALL DANN
Commissioner of Patents and Trademarks